United States Patent
Goodhart et al.

[15] 3,687,321
[45] Aug. 29, 1972

[54] LOAD CARRYING VEHICLE

[72] Inventors: Steven E. Goodhart; Alfred C. Channels, both of Vineland, N.J.

[73] Assignee: Stanray Corporation, Chicago, Ill.

[22] Filed: March 24, 1970

[21] Appl. No.: 22,192

[52] U.S. Cl. .................... 214/512, 14/71, 214/83.24
[51] Int. Cl. .............................................. B60p 1/02
[58] Field of Search ......... 14/71, 72; 214/83.24, 512, 214/730

[56] References Cited

UNITED STATES PATENTS

| | | |
|---|---|---|
| 3,090,514 | 5/1963 | Black, Sr., et al. ......... 214/512 |
| 3,167,796 | 2/1965 | Layne ............................. 14/71 |
| 3,409,922 | 11/1968 | Beckwith et al. .............. 14/71 |
| 2,797,833 | 7/1957 | Cash, Jr. ...................... 214/512 |
| 3,233,767 | 2/1966 | Goodacre .................... 214/512 |
| 2,670,484 | 3/1954 | Bintliff et al. ................... 14/72 |
| 3,126,112 | 3/1964 | Shaw et al. .................. 214/512 |
| 3,121,243 | 2/1964 | Phillips .......................... 14/71 |
| 3,317,942 | 5/1967 | Wollard et al. ................. 14/71 |
| 3,552,557 | 1/1971 | Green ...................... 214/730 X |
| 3,175,238 | 3/1965 | Pennington .................... 14/71 |

*Primary Examiner*—Robert J. Spar
*Attorney*—Whittemore, Hulbert & Belknap

[57] ABSTRACT

This invention relates to vehicles adapted to load and unload cargo and other material into and from aircraft. The present vehicle is provided with a loading platform which can be elevated, laterally adjusted and extended forwardly for alignment with an opening in the aircraft. Controls are provided to prevent abnormal contact or misalignment between the platform and aircraft as well as to automatically raise or lower the platform when the height of the opening above ground level varies due to loading or unloading.

4 Claims, 6 Drawing Figures

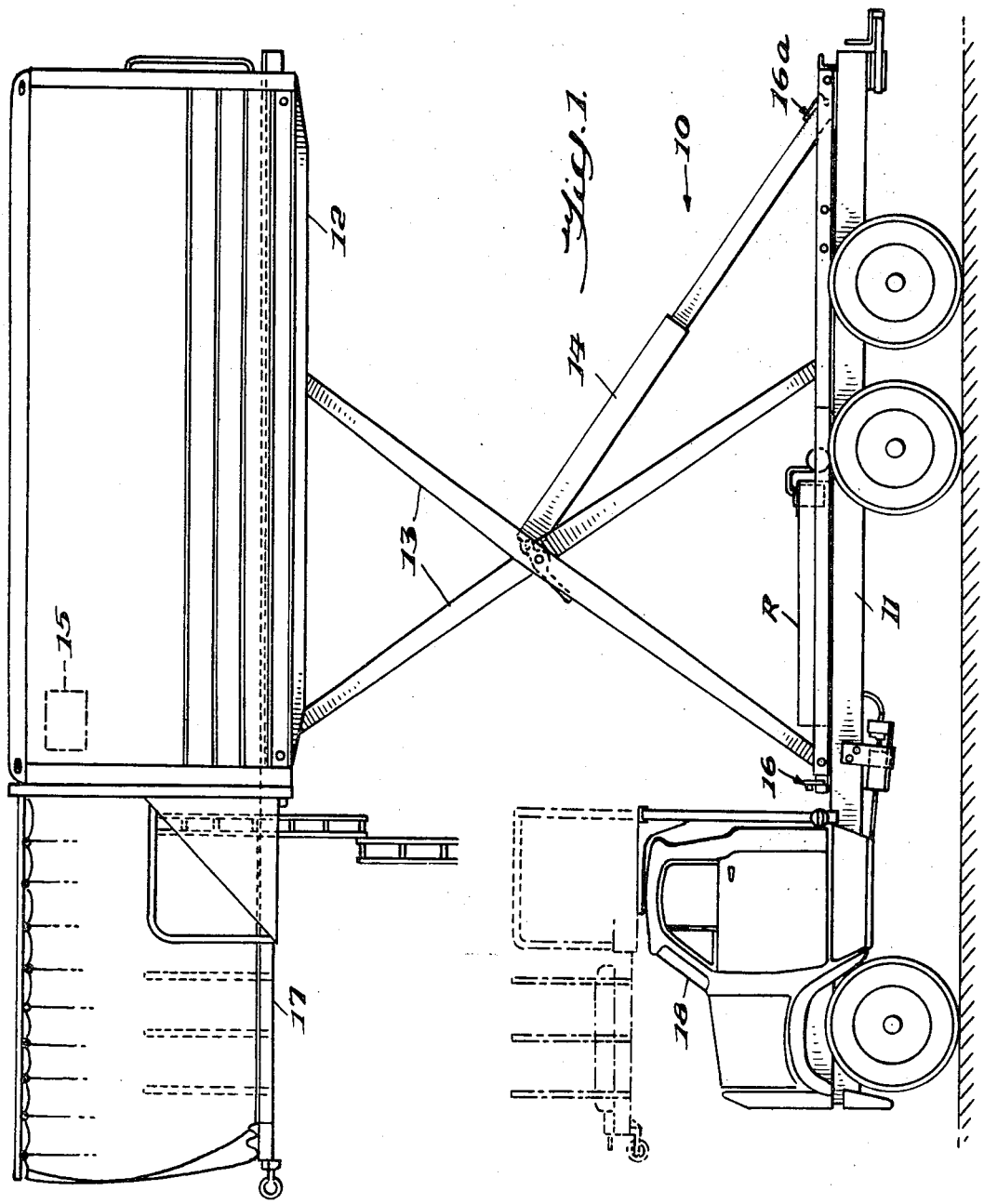

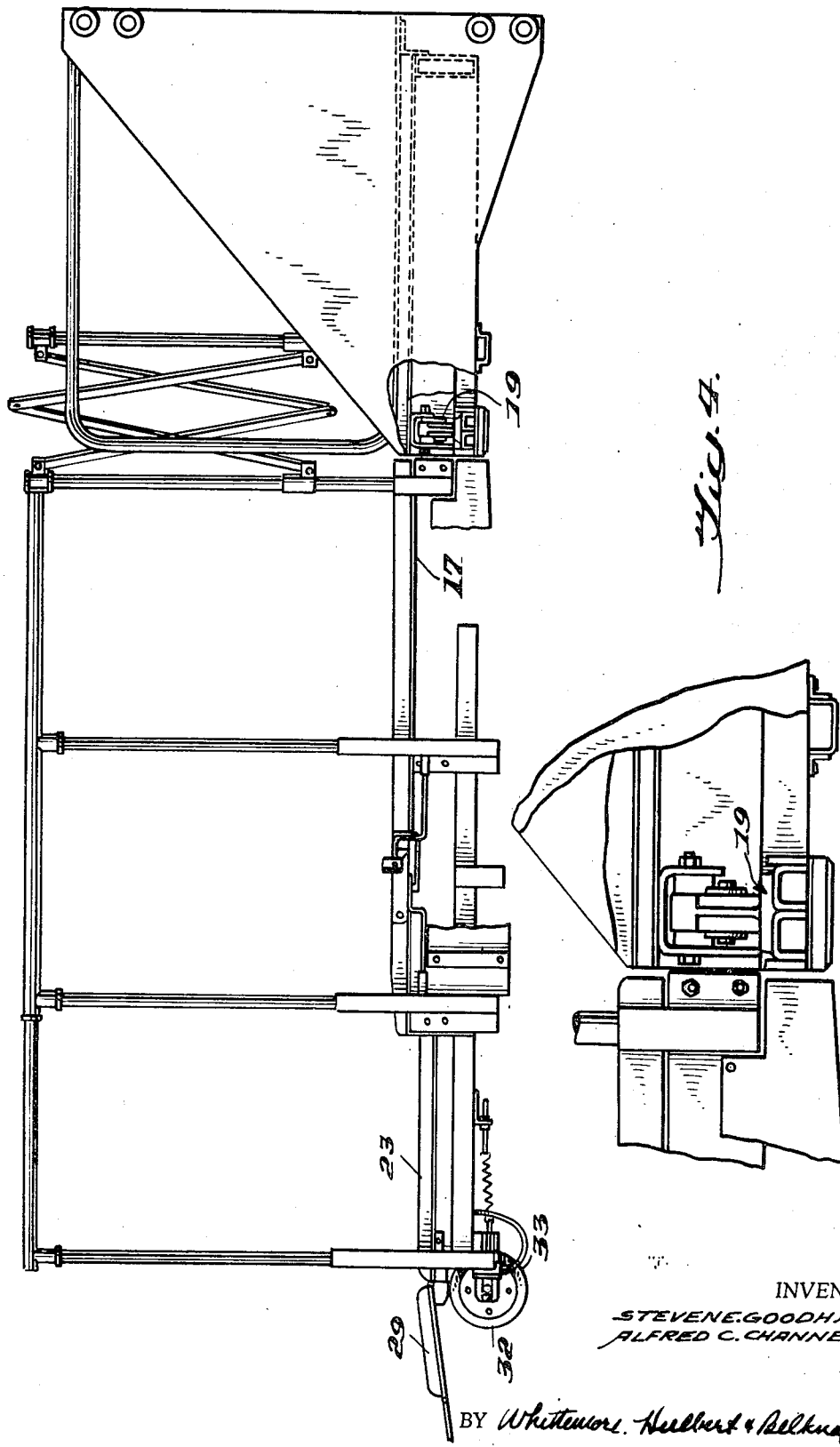

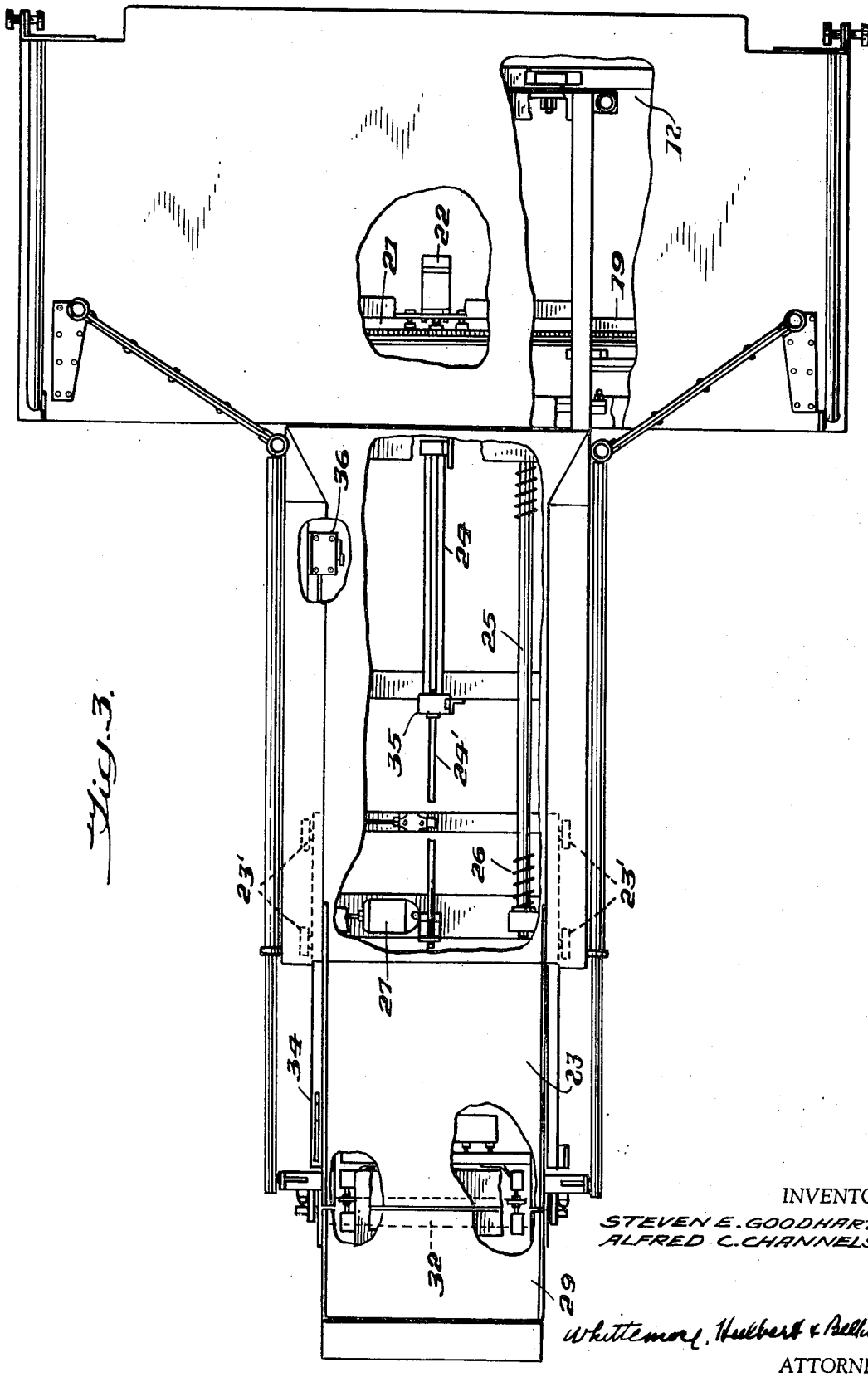

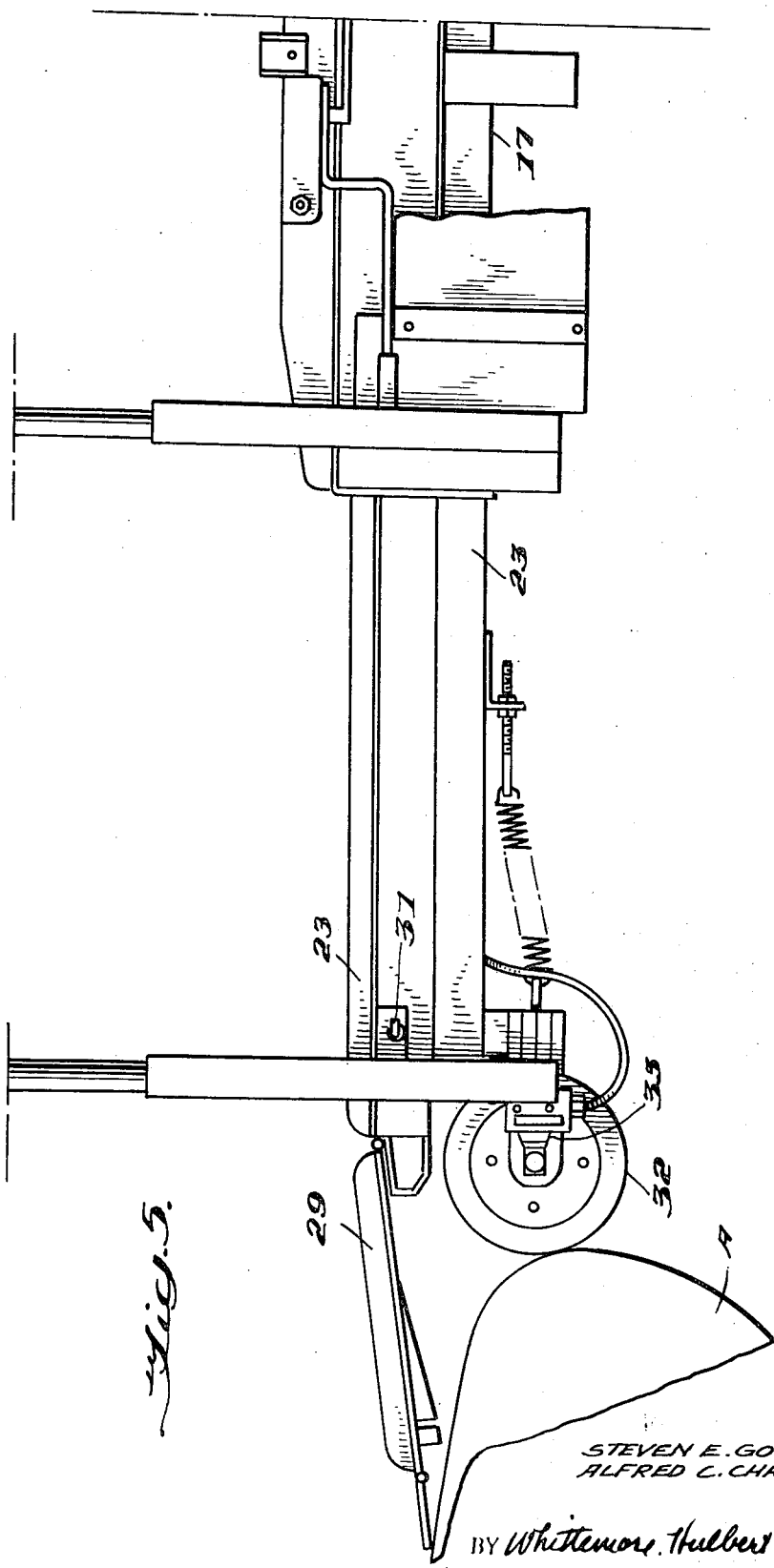

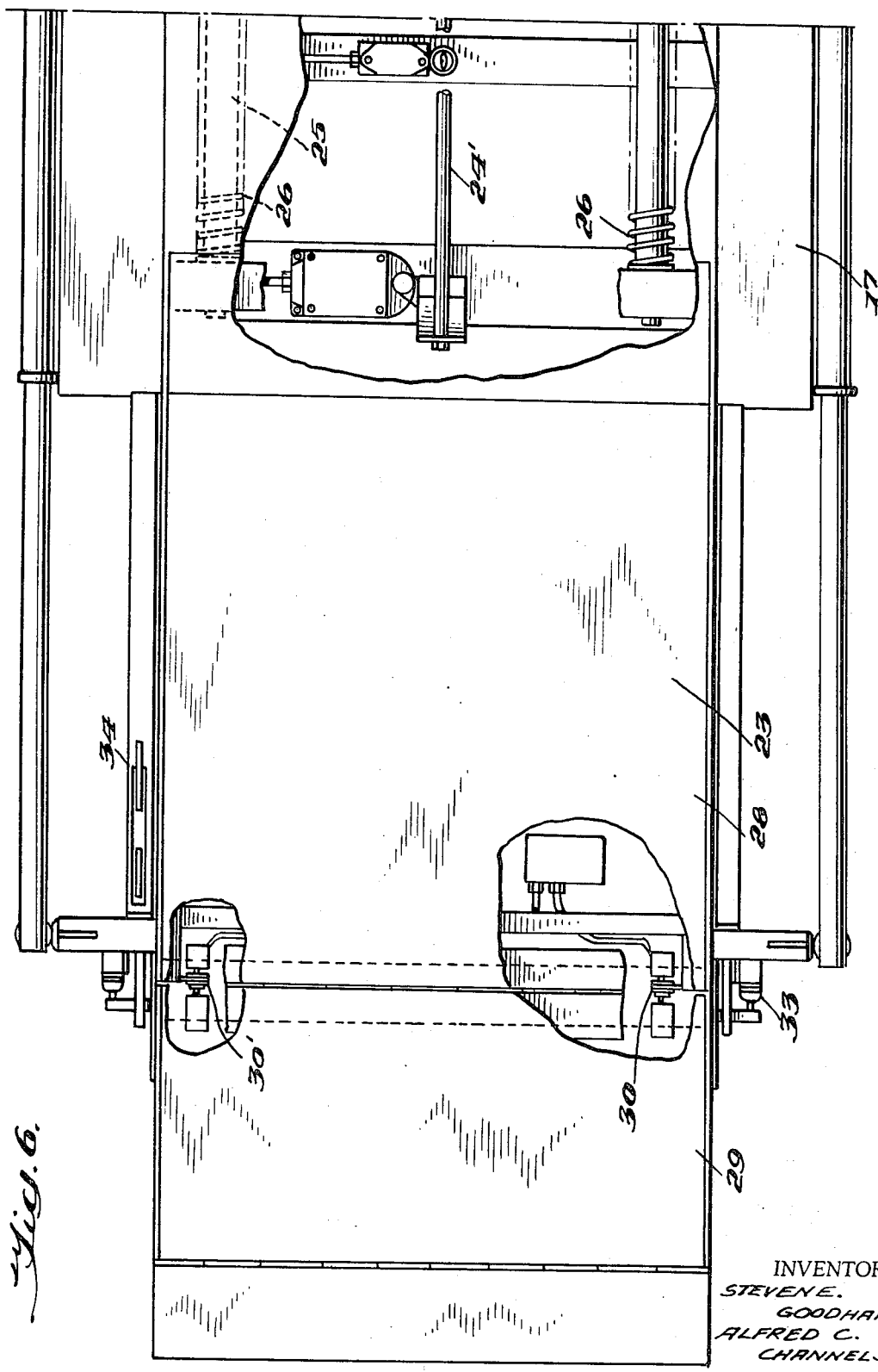

LOAD CARRYING VEHICLE

The present invention relates to vehicles having bodies adapted to be elevated and aligned with openings in aircraft. More specifically, the invention contemplates the provision of a high-lift body and platform having an extensible ramp together with automatic controls adapted to position the platform with the aircraft opening. The invention further includes electrically operated controls for automatically adjusting the loading ramp to compensate for changes in the height of the aircraft opening due to conditions associated with the loading and unloading of the aircraft. Other objects of the invention will be apparent from the following description and the accompanying drawings.

FIG. 1 is a side-elevation of a vehicle including a chassis, an elevatable body, a platform and an extended bridge;

FIG. 2 is a side-elevation of the bridge and platform shown in FIG. 1;

FIG. 3 is a top plan view of the bridge and platform shown in FIG. 2; and

FIG. 4 is an enlarged end view of the track shown in FIG. 2;

FIG. 5 is an enlarged side view of one end of the bridge shown in FIG. 2; and

FIG. 6 is an enlarged top view of one end of the bridge shown in FIG. 3.

It is recognized that the problems accompanying the increase in overall size of modern aircraft, both passenger and cargo, have necessitated innovations in the vehicles employed for carrying and transferring cargo, commissary items and other materials to and from aircraft. Many of these vehicles support a body or platform mounted on elevating mechanism which lifts the body to a height corresponding with that of an opening in the aircraft through which the cargo is transferred from the vehicle to the aircraft. When the body has been aligned with the opening it is customary to extend a movable bridge supported by the body into proximity with the aircraft but not into such actual contact with the side of the plane that it will be damaged. In the present invention, a sensitized bumper is employed to prevent abnormal contact between the bridge and the outer surface of the aircraft.

During loading and unloading of aircraft there is a tendency for openings in the craft to change vertical distances with respect to the ground. When a loading bridge is extended into an aircraft, the height of the opening of which varies due to loading or unloading, it is desirable that the bridge follow the vertical movement of the aircraft whether it be up or down. This invention provides controls responsive to such changes to elevate or lower the bridge automatically in accordance with variations in the height of the opening.

In addition to control means responsive to vertical changes, the bridge is provided with means to compensate for rolling or horizontal swaying of the aircraft.

Referring to the drawings the vehicle 10 includes a chassis 11, a vertically movable body 12, scissors type levers 13, hydraulic ram 14, the arrangement of elements being somewhat similar to that illustrated in the U.S. Pat. to A. Cresci, No. 2,899,172. A solenoid valve 16 controls the supply of fluid from the pump to the hydraulic ram to elevate the body, valve 16a being adapted to release fluid from the ram to a storage reservoir R when the body is to be lowered. Switches under control of the operator on a control board 15 located in the body provide for elevating and lowering the body.

The body 12 supports a platform assembly 17 extending forwardly and overlying the cab 18 of the vehicle. The platform is mounted for lateral movement on tracks 19, fixed to the platform, the platform being moved by a motor 22 attached thereto and adapted to be moved laterally in a selected direction on chain 21 under control of the operator. Slidably supported within the platform is an extending bridge 23, adapted to be extended forwardly by springs 26 surrounding fixed guide rods 25. The extending bridge 23 is supported by roller bearings 23'. A cylinder 24 and piston 24' are adapted to be supplied with fluid under pressure for retracting the bridge from its extended position against the force exerted by springs 26. Normally the bridge is retained in retracted position until the body 12 has been raised into substantially aligned relation with the loading opening of the aircraft.

The extending bridge 23 is then moved in stages to its extended position by releasing fluid under pressure on one side of cylinder 24. The springs 26 move the bridge forwardly and when the bridge is extended to its neutral position, in which it is in contact with the body of the aircraft, the springs permit the bridge to adjust itself to any roll or sway of the aircraft. Forward extension of the bridge is limited to a selected distance determined by the location of limit switch 27 adapted to interrupt release of fluid from cylinder 24, as will be described hereinafter. Also slidably supported under extending bridge 23 is a dock board 29 having a hinged forward portion. When the extending bridge has been properly aligned with the aircraft door opening, the dock board or ramp is manually extended into the aircraft, the forward end resting on the floor of the aircraft A.

A pair of normally open switches 30, 30' are adapted to be closed if the hinged ramp end is either raised or lowered with respect to a selected horizontal position, as would occur if the distance of the aircraft floor with respect to ground level is increased or diminished. The switches respond in one position to raising of the ramp and to actuate valve 16 to that position in which fluid is supplied to ram 14 thus to raise the platform and the ramp. In another position of the switches they respond to lowering of the plane floor to move valve 16a to fluid release position so that the platform and ramp are lowered. Operation of the switches 30, 30' is dependent on closure of toggle switch 31 on the driver's side of the ramp and a switch on the control board 15. It will thus be seen that the bridge and ramp follow any vertical movement of the aircraft floor such as might occur during loading or unloading so that horizontal alignment of the bridge ramp and aircraft floor is automatically maintained.

A rubber roller bumper 32 is journaled forwardly of the bridge 23 on a horizontal shaft, the latter being mounted to swivel on a vertical pivot intermediate the ends of the bumper. Under normal conditions the bumper can rotate and swivel to adjust itself to the roll of the aircraft but when subjected to abnormal contact with the aircraft, such that damage to the aircraft might result due to improper alignment or spacing of the bridge with respect to the aircraft, means are provided to retract the bumper from contact with the plane as will be hereinafter explained.

When the cargo loader is to be positioned with respect to the aircraft opening for loading or unloading, the vehicle is driven into approximate alignment of the loading platform and the opening in the side of the aircraft. The platform with the extending bridge in retracted position, is then elevated to the desired height, that is, to position the platform at the same elevation as that of the aircraft floor. Should transverse adjustment of the platform be necessary the motor 22 is energized to move the platform and bridge transversely of the vehicle.

Fluid under pressure is then released on to that side of cylinder 24 which permits springs 26 to move the extending bridge to a position midway of its full travel distance (neutral position), limit switch 35 being closed to operate a valve which interrupts the release of fluid from cylinder 24. Suitable alignment conditions having now been met, the bumper 32 should be in contact with aircraft. Additional fluid under pressure is then released allowing cylinder 24 to move to its fully extended position which is determined by limit switch 27. All forward movement will now be provided for by the springs 26. The dock board 29 is then drawn out to rest on the floor of the aircraft and is held in extended position by locking means 39. As explained before any pivotal movement of the dock board controls the height of the platform When the extending bridge is to be retracted solenoid valve means under control of a conventional switch admits fluid to the opposite side of cylinder 24 to pull the extending bridge rearwardly against springs 26 until limit switch 36 actuates the solenoid valve to interrupt supply of fluid to the cylinder.

Except when limit switch 27 is closed during full extension of the cylinder the bumper 32 is sensitized in the sense that normally open switch contacts 33 is adapted to be closed if the bumper contacts the aircraft. This may occur if the loading vehicle has been positioned too close to the aircraft and the elevating mechanism has been actuated. Under these conditions the closing of switch 33 energizes solenoid valve 16 to interrupt supply of fluid to the lifting ram and at the same time energizes solenoid valve 16a to release fluid from the ram. While the limit switches 35, 36 are closed the switch 33 will control supply of fluid to ram 14. Likewise under similar conditions, that is, when switch 27 is closed, the motor 22 cannot be energized to effect transverse movement of the platform.

From the foregoing description of the invention it will be apparent that the loading vehicle is equipped to be readily and accurately aligned with the loading opening of an aircraft and to automatically adjust its components to such changes as occur during the usual operation of loading. At the same time safety measures are provided to prevent injury to the aircraft due to misalignment or abnormal relative movements between the loading apparatus and the aircraft during loading or unloading.

What is claimed is:

1. A load carrying vehicle including a chassis frame, a body adapted to be supported by said chassis frame, means for elevating said body, a platform, said body supporting said platform for lateral movement relative thereto, means for laterally moving said platform relative to said body, an extending bridge slidably supported forwardly on said platform, a pair of transversely spaced compressible spring means interposed between said platform and said extending bridge to urge said bridge forwardly relative to said platform, said spring means adapted to yield to rearwardly imposed pressure longitudinal of said extending bridge, means for limiting forward movement of said extending bridge, and means for compressing said spring means to maintain said extending bridge in retracted position.

2. A load carrying vehicle as defined in claim 1, in which said means for compressing said spring means comprises a fluid operated piston cooperating with said bridge.

3. A load carrying vehicle as defined in claim 1, in which the platform is mounted on tracks extending transversely of said body, and the means for moving said platform along said tracks comprises an operator controlled motor.

4. A load carrying vehicle as defined in claim 2, in which limit switch means responsive to a definite rearward movement of said extending bridge interrupts the supply of fluid to said piston.

* * * * *